US011927145B2

United States Patent

Dulac et al.

(12) United States Patent
(10) Patent No.: US 11,927,145 B2
(45) Date of Patent: Mar. 12, 2024

(54) METHOD FOR LIMITING AN AIR CHARGE OF AN INTERNAL COMBUSTION ENGINE

(71) Applicant: Robert Bosch GmbH, Stuttgart (DE)

(72) Inventors: Adrien Dulac, Stuttgart (DE); Joshua Emanuel Weiss, Flein (DE); Michael Stein, Loechgau (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 18/324,029

(22) Filed: May 25, 2023

(65) Prior Publication Data

US 2024/0052795 A1 Feb. 15, 2024

(30) Foreign Application Priority Data

Aug. 10, 2022 (DE) ..................... 10 2022 208 309.1

(51) Int. Cl.
*F02D 35/00* (2006.01)
*F02D 33/02* (2006.01)

(52) U.S. Cl.
CPC ......... *F02D 35/0023* (2013.01); *F02D 33/02* (2013.01)

(58) Field of Classification Search
None
See application file for complete search history.

(56) References Cited

U.S. PATENT DOCUMENTS 5,303,168 A * 4/1994 Cullen ................ F02D 41/0072 123/568.21
10,400,697 B2 * 9/2019 Miura ....................... F01N 3/20
2003/0187568 A1 * 10/2003 Yasui ..................... G05D 23/27 123/697
2004/0030485 A1 * 2/2004 Yasui ................. F02D 41/1494 60/276
2013/0080034 A1 * 3/2013 Chi ..................... F02D 41/1401 701/108
2015/0345412 A1 * 12/2015 Conte ..................... F02B 37/24 701/102
2016/0177852 A1 * 6/2016 Wang ................. F02D 41/0007 701/108

FOREIGN PATENT DOCUMENTS

DE 102004033969 A1 8/2005
GB 2530737 A * 4/2016 ......... F02D 41/1447
WO WO-2009016266 A2 * 2/2009 ............ F01N 3/106

* cited by examiner

*Primary Examiner* — Hung Q Nguyen
(74) *Attorney, Agent, or Firm* — NORTON ROSE FULBRIGHT US LLP; Gerard A. Messina

(57) ABSTRACT

A method for limiting an air charge of an internal combustion engine. A maximum permissible pre-controlled charge and an exhaust-gas temperature-dependent delta charge are determined by means of a PI controller. A total permissible charge is determined on the basis of the maximum permissible pre-controlled charge and the exhaust-gas temperature-dependent delta-charge, and the air charge of the internal combustion engine is limited by the total permissible charge.

8 Claims, 2 Drawing Sheets

METHOD FOR LIMITING AN AIR CHARGE OF AN INTERNAL COMBUSTION ENGINE

CROSS REFERENCE

The present application claims the benefit under 35 U.S.C. § 119 of German Patent Application No. DE 10 2022 208 309.1 filed on Aug. 10, 2022, which is expressly incorporated herein by reference in its entirety.

FIELD

The present invention relates to a method and a device for limiting an air charge of an internal combustion engine.

BACKGROUND INFORMATION

Exhaust gas components in internal combustion engines are often subject to high temperatures. These often occur in dynamic operating conditions with high loads, but in some cases also as a result of internal engine adjustments to combustion, e.g., particulate filter regeneration.

Conventional methods for protecting components in the exhaust tract, using simple ramp functions to reduce cylinder air charge, are available. The cylinder air charge is subsequently ramped up again when the exhaust gas temperature has fallen below a hysteresis threshold and critical temperatures are no longer present.

German Patent Application No. DE 10 2004 033 969 A1 describes a method for controlling temperature downstream of a catalytic converter (44) in the exhaust tract of an internal combustion engine (10) with a first control loop (48, 24, 10), in which a first control variable is formed from a first control deviation, which is formed from a first actual value and a first target value and influences internal engine heat generation. In this case, the first actual value is determined as a measure of a temperature downstream of the catalytic converter (44). The method is characterized by a second control loop (50, 24, 10), in which at least a second control variable is formed from a second control deviation, which is formed from a second actual value and a second target value, wherein a temperature upstream of the catalytic converter (44) is determined as the second actual value. Furthermore, a control device that controls the sequence of such a method is presented.

SUMMARY

The present invention relates to a method for limiting an air charge of an internal combustion engine, preferably the air charge of cylinders for the internal combustion engine, wherein a maximum permissible pre-controlled charge and an exhaust-gas temperature-dependent delta charge are determined by means of a PI controller, wherein a total permissible charge is determined on the basis of the maximum permissible pre-controlled charge and the exhaust-gas temperature-dependent delta charge, and the air charge of the internal combustion engine is limited by the total permissible charge.

The method has the particular advantage that an optimum protection for component temperatures is obtained by combining the control of a pre-control and the control via a PI controller, wherein the limitation of the air charge means only a minimal reduction of the maximum engine torque for the vehicle driver.

Thus, critical component temperatures may be robustly maintained, wherein the method additionally has no deteriorating effect on exhaust emissions.

Such load point shift allows the components installed in the exhaust tract, such as manifolds, turbochargers, catalytic converters, as well as outside the catalytic converter, flex pipes, lambda sensors and other components to be protected from overheating with minimal intervention on the torque, wherein the measure is hardly noticeable to the vehicle driver.

The pre-control may be particularly important here, because it ensures that the most accurate pre-controlled cylinder charge possible is provided, ensuring that the maximum temperatures in the exhaust tract are maintained and that the PI controller has to readjust as little as possible. This provides the vehicle driver with the most constant torque possible, despite active limitation of the cylinder charge.

A further particular advantage is that critical temperatures may be defined across the entire exhaust tract. These are not limited to temperature sensors. By means of conventional temperature models, positions at desired locations, e.g., downstream or upstream of components, may also be defined.

In an advantageous embodiment of the present invention, the maximum permissible pre-controlled charge can be determined by means of a characteristic curve approach or an inverted exhaust gas temperature model.

This may have the particular advantage that the method can be carried out robustly and in a resource-saving manner by the control device.

Furthermore, the inverted exhaust gas temperature model is particularly easy to populate with data, preferably during an application phase of the internal combustion engine.

Furthermore, according to an example embodiment of the present invention, the exhaust-gas temperature-dependent delta charge can be determined by means of a PI controller on the basis of a difference between the actual manifold temperature and a predeterminable limit value of the component to be protected in the exhaust tract, preferably the first limit value.

In a preferred embodiment of the present invention, the exhaust gas temperature model can be determined on the basis of a speed of the internal combustion engine and a target temperature at the exhaust valve, particularly in an application phase.

In an advantageous embodiment of the present invention, a release condition for the method is issued if one of the predeterminable actual temperatures of the components installed in the exhaust tract exceeds its relevant temperature threshold value.

In further aspects, the present invention relates to a device, in particular a control device and a computer program, which are set up, in particular programmed, to execute one of the methods. In a still further aspect, the present invention relates to a machine-readable storage medium on which the computer program is stored.

An object of the method is to define the most stable possible limitation of the air charge on the basis of the temperature prevailing in the exhaust tract, without causing major impairments in the driving behavior for the vehicle driver, and to replace the conventional reducing of the charge by means of a fixed ramp course.

DETAILED DESCRIPTION OF EXAMPLE EMBODIMENTS

Figure 1:
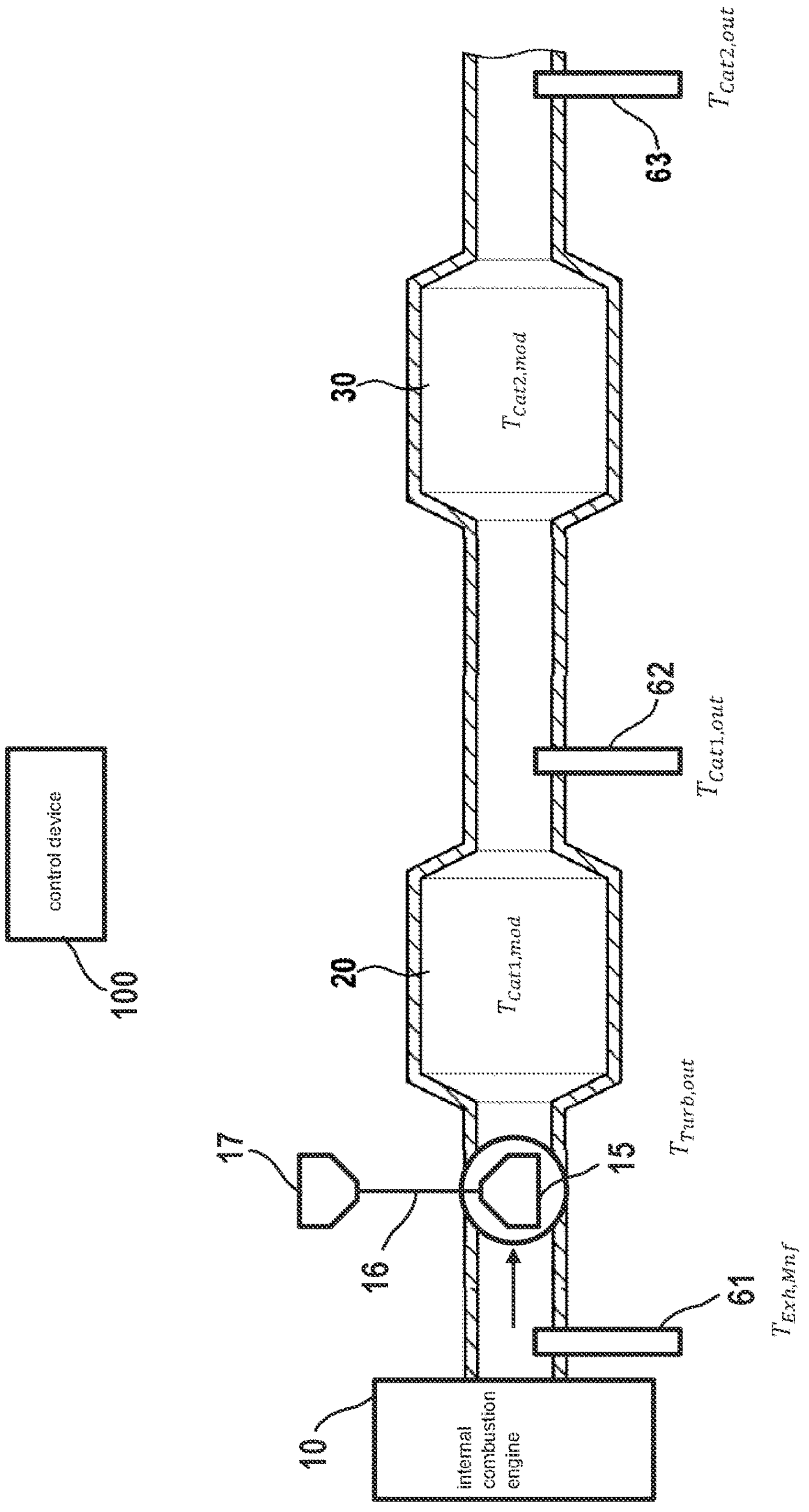
FIG. 1 shows a schematic illustration of an exemplary embodiment of a catalytic converter system that is suitable for carrying out the method according to the present invention.

FIG. 1 shows a schematic illustration of an exemplary structure of an exhaust tract with two catalytic converters 20, 30 connected in series. The exhaust tract of an internal combustion engine 10 is shown, wherein the internal combustion engine 10 emits combustion exhaust gases in the direction of the arrow. For example, the exhaust gas aftertreatment system comprises a first catalytic converter 20. This is followed by a second catalytic converter 30. A compressor 17 of a turbocharger 16 can be arranged upstream of the internal combustion engine 10. A first temperature sensor 61 is arranged downstream of the internal combustion engine 10 and upstream of the exhaust turbine 15 of the turbocharger 16. The first catalytic converter 20 then follows downstream of the exhaust turbine 15 of the turbocharger 16. A second temperature sensor 62 can be arranged downstream of the first catalytic converter 20 and upstream of the second catalytic converter 30.

A third temperature sensor 63 can be arranged downstream of the second catalytic converter.

The sensors are connected to a control device 100, for example by cable, and the control device 100 receives the signals from the sensors and subsequently stores them.

The system further comprises an air-mass sensor not further shown, e.g., a hot-film air-mass sensor (HFM) in an air intake tract not further shown, which determines the exhaust gas mass flow $dm_{exh}$. Furthermore, conventional engine variables, such as the injection quantity $q_{inj}$, charge values, such as the cylinder charges $ratairchrg_{cyl}$, an air-fuel ratio λ, a driver's desired torque, a speed $n_{eng}$ are available to the control device 100.

Furthermore, the control device 100 comprises a model for determining the ignition angle $ZW_{actual}$ along with an exhaust gas temperature model.

The first temperature sensor 61 can preferably be used to determine a manifold temperature $T_{Exh,Mnf}$. Furthermore, a turbine temperature $T_{Turb,out}$ downstream of the exhaust turbine 15 and upstream of the first catalytic converter 20 can also be determined on the basis of the first temperature sensor using a temperature model.

The second temperature sensor 62 can be used to determine a first catalytic converter temperature $T_{Cat1,out}$ downstream of the first catalytic converter 20. Furthermore, a temperature model stored on the control device 100 can be used to determine a first modeled catalytic converter temperature $T_{Cat1,mod}$ for the first catalytic converter 20 on the basis of the first catalytic converter temperature $T_{Cat1,out}$.

The third temperature sensor 63 can be used to determine a second catalytic converter temperature $T_{Cat1,out}$ downstream of the second catalytic converter 30. Furthermore, a temperature model stored on the control device 100 can be used to determine a second modeled catalytic converter temperature $T_{Cat2,mod}$ for the second catalytic converter 30 on the basis of the second catalytic converter temperature $T_{Cat2,out}$. Alternatively, the first catalytic converter temperature $T_{Cat1,out}$ can also be used as an input variable.

The temperature model that is used here, which is stored on the control device 100, can determine different temperature values within the exhaust tract on the basis of a plurality of input variables, such as the engine load and/or engine speed $n_{eng}$ and/or the ignition angle efficiency η and/or the air-fuel ratio λ and/or the vehicle speed and/or ambient temperature $T_{Env}$ and/or exhaust gas temperature $T_{exh}$.

Furthermore, in an application phase, temperature limit values for components installed in the exhaust tract are stored in the control device 100, wherein such temperature limit values must not be exceeded or permanently exceeded. Temperatures may also be determined or modeled at desired locations in the exhaust tract, such as the location near the exhaust valves of the internal combustion engine 10.

Figure 2:
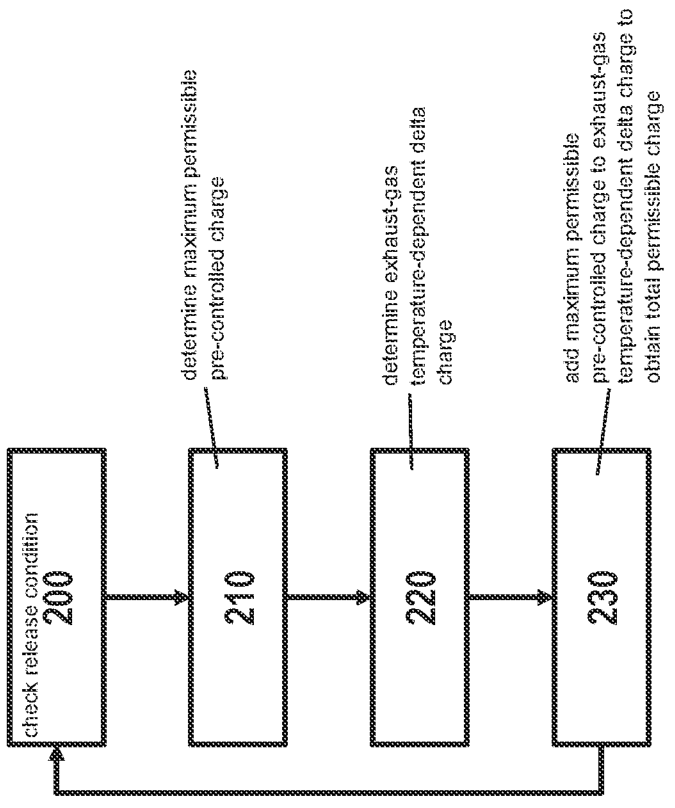
FIG. 2 shows a schematic flow diagram of an exemplary embodiment of the method according to the present invention for limiting an air charge.

FIG. 2 shows a first exemplary sequence of the method for limiting the charge control for an internal combustion engine.

In a first step 200, a release condition for the method is checked by means of the control device 100.

For this purpose, a plurality of actual temperatures within the exhaust tract is continuously determined by the control device 100.

In the following example, this is limited to the manifold temperature $T_{Exh,Mnf}$, the first catalytic converter temperature $T_{Cat1,out}$ and the second catalytic converter temperature $T_{Cat2,out}$.

However, the method can be applied without limitation to any temperature that can be measured or modeled in the exhaust tract. For example, temperatures from sensors, such as the temperature signals or temperatures of the first, second and third temperature sensors 61, 62, 63 may be used. Alternatively, however, temperatures in the exhaust tract modeled via temperature models can also be used.

For each temperature determined, a temperature limit value is stored in the control device 100, which was preferably determined in an application phase for the monitored temperatures.

In the present example, these temperature limit values are referred to as a first limit value $S_{Exh,Mnf}$ for the manifold temperature $T_{Exh,Mnf}$, a second limit value $S_{Cat1,mod}$ for the first catalytic converter 20, and a third limit value $S_{Cat2,mod}$ for the second catalytic converter 30.

The control device 100 now continuously determines the manifold temperature $T_{Exh,Mnf}$, the first catalytic converter temperature $T_{Cat1,out}$ and the second catalytic converter temperature $T_{Cat2,out}$.

If one of the monitored temperatures $T_{Exh,Mnf}$, $T_{Cat1,out}$, $T_{Cat2,out}$ exceeds its relevant limit value $S_{Exh,Mnf}$, $S_{Cat1,mod}$, $S_{Cat2,mod}$, the release is issued and the method can be continued in a step 210.

In an alternative embodiment, a predeterminable time period as to how long a monitored temperature $T_{Exh,Mnf}$, $T_{Cat1,out}$, $T_{Cat2,out}$ must exceed the relevant limit value $S_{Exh,Mnf}$, $S_{Cat1,mod}$, $S_{Cat2,mod}$ before the method is continued in a step 210 can also be stored in the control device 100.

In a further advantageous embodiment, it can also be determined by means of a predictive function calculated on the control device 100 whether one of the monitored temperatures $T_{Exh,Mnf}$, $T_{Cat1,out}$, $T_{Cat2,out}$ will exceed the relevant limit value $S_{Exh,Mnf}$, $S_{Cat1,mod}$, $S_{Cat2,mod}$, and if exceeding is detected the release is issued and the method can be continued in step 210.

In the following example, it is assumed that the manifold temperature $T_{Exh,Mnf}$ exceeds or will exceed the first limit value $S_{Exh,Mnf}$.

In a step 210, a maximum permissible pre-controlled charge $ratairchrg_{pre}$ is determined by means of a pre-control.

In a first embodiment, the maximum permissible pre-controlled charge $ratairchrg_{pre}$ can be determined by means of a characteristic curve approach.

The air mass flow rate $mf_{air,cyl}$ or the intake air participating in the combustion, the basic ignition angle $ZW_{Bas}$ at the knock limit, the actual ignition angle $ZW_{Gru}$ and the speed $n_{eng}$ are used as input variables for the characteristic diagram.

On the basis of the current speed $n_{eng}$, a maximum permissible pre-controlled charge based on the actual ignition angle $ZW_{Gru}$ and a maximum permissible pre-controlled charge based on the latest permissible ignition angle are determined from two characteristic diagrams in each case.

Furthermore, a weighting factor G is determined for interpolating the characteristic curve approach on the basis of the ignition angle retardation and the speed $n_{eng}$. In this case, the ignition angle retardation results from the difference between the basic ignition angle $ZW_{Bas}$ at the knock limit and the actual ignition angle $Z_{Gru}$.

By means of a simple interpolation, the maximum permissible pre-controlled charge $rataircharg_{pre}$ for component protection can subsequently be determined based on the characteristic approach for the pre-control.

Subsequently, the method will be continued in a step 220.

In a second embodiment, the maximum permissible pre-controlled charge $rataircharg_{pre}$ on the basis of the component protection can also be determined by means of an inverse exhaust gas temperature (EGT) model. The maximum permissible exhaust gas temperature in the manifold is first determined for component protection and subsequently corrected for a heat loss between the quasi-stationary exhaust gas temperature in the manifold and the exhaust gas temperature downstream of the exhaust valve. The exhaust gas temperature downstream of the exhaust valves is determined by means of a model stored on the control device 100 on the basis of the speed $n_{eng}$ and/or a relative humidity in the cylinder and/or an ignition angle and/or lambda correction.

In this case, a difference between the exhaust gas temperature at the manifold and the exhaust gas temperature downstream of the exhaust valves is determined and subsequently added to the maximum permissible exhaust gas temperature in the manifold, and a maximum permissible exhaust gas temperature at the exhaust valves is obtained.

The maximum permissible exhaust gas temperature at the exhaust valve is subsequently corrected by a correction factor of the current ignition angle efficiency and the air-fuel ratio $\lambda$.

The lambda correction factor is determined on the basis of a target lambda limitation and the ignition angle efficiency correction factor is determined on the basis of the actual ignition angle efficiency.

This gives a target temperature at the exhaust valves for component protection.

On the basis of the target temperature at the exhaust valves for component protection and the current speed $n_{eng}$, the maximum permissible pre-controlled charge $rataircharg_{pre}$ is then determined by means of the inverse exhaust gas temperature (EGT) model on the basis of the inverse characteristic diagram. The inverse basic characteristic diagram is determined during an application phase on the basis of the speed $n_{eng}$ and a target temperature at the exhaust valve for the inverse exhaust gas temperature approach for calculating the maximum permissible charge on the basis of component protection and stored in the control device 100.

Subsequently, the method can be continued in a step 220.

In a step 220, an exhaust-gas temperature-dependent delta charge $rataircharg_{PI}$ is determined by means of a PI controller. For this purpose, a difference between the actual manifold temperature $T_{Exh,Mnf}$, and the first limit value $S_{Exh,Mnf}$ is determined and used as an input variable for a PI controller.

The output signal of the PI controller is the exhaust-gas temperature-dependent delta charge $rataircharg_{PI}$.

This calculation runs simultaneously with the calculation of the maximum permissible pre-controlled charge $rataircharg_{pre}$. Subsequently, the method can be continued in a step 230.

In a step 230, the maximum permissible pre-controlled charge $rataircharg_{pre}$ is added to the exhaust-gas temperature-dependent delta charge $rataircharg_{PI}$ and a total permissible charge $rataircharg_{ges}$ is obtained.

This total permissible charge $rataircharg_{ges}$ is fed to a maximum selector, wherein the maximum is selected between the total permissible charge $rataircharg_{ges}$ and a speed-dependent limit for charge reduction on the basis of component protection.

The result of the maximum selection is subsequently given to the charge control in the control device 100 and the charge for the combustion is limited so that a maximum temperature can be maintained in the exhaust tract or at the component to be protected.

Subsequently, the method can be continued or terminated again in step 200.

The limitation of the charge can preferably be carried out over a time range, or until the manifold temperature $T_{Exh,Mnf}$ falls below a predeterminable temperature $S_{Reset}$.

What is claimed is:

1. A method for limiting an air charge of an internal combustion engine, the method comprising the following steps:
- determining, using a PI controller, a maximum permissible pre-controlled charge and an exhaust-gas temperature-dependent delta charge;
- determining a total permissible charge based on the maximum permissible pre-controlled charge and the exhaust-gas temperature-dependent delta-charge; and
- limiting the air charge of the internal combustion engine by the total permissible charge.

2. The method according to claim 1, wherein the air charge is an air charge of cylinders of the internal combustion engine.

3. The method according to claim 1, wherein the maximum permissible pre-controlled charge is determined using a characteristic curve approach or an inverted exhaust gas temperature model.

4. The method according to claim 1, wherein the exhaust-gas temperature-dependent delta charge determined using the PI controller based on a difference between an actual manifold temperature and a predeterminable limit value of a component to be protected in an exhaust tract.

5. The method according to claim 1, wherein an exhaust gas temperature model is determined based on a speed of the internal combustion engine and a target temperature at an exhaust valve, in an application phase.

6. The method according to claim 1, wherein a release condition for the method is issued when one of predeterminable actual temperatures of components installed in an exhaust tract exceeds its respective temperature threshold value.

7. A non-transitory machine-readable storage medium on which is stored a computer program for limiting an air charge of an internal combustion engine, the computer program, when executed by a computer, causing the computer to perform the following steps:
- determining, using a PI controller, a maximum permissible pre-controlled charge and an exhaust-gas temperature-dependent delta charge;

determining a total permissible charge based on the maximum permissible pre-controlled charge and the exhaust-gas temperature-dependent delta-charge; and limiting the air charge of the internal combustion engine by the total permissible charge.

8. An electronic control device configured to limit an air charge of an internal combustion engine, the control device configured to:

determine, using a PI controller, a maximum permissible pre-controlled charge and an exhaust-gas temperature-dependent delta charge;

determine a total permissible charge based on the maximum permissible pre-controlled charge and the exhaust-gas temperature-dependent delta-charge; and limit the air charge of the internal combustion engine by the total permissible charge.

* * * * *